(12) United States Patent
Dwyer et al.

(10) Patent No.: US 11,169,175 B2
(45) Date of Patent: Nov. 9, 2021

(54) MULTILAYER EXCITATION RING

(71) Applicant: Honeywell International Inc., Morris Plains, NJ (US)

(72) Inventors: Paul W. Dwyer, Seattle, WA (US); Charles N. Schmidt, Kirkland, WA (US)

(73) Assignee: Honeywell International Inc., Charlotte, NC (US)

(*) Notice: Subject to any disclaimer, the term of this patent is extended or adjusted under 35 U.S.C. 154(b) by 0 days.

(21) Appl. No.: 16/787,725

(22) Filed: Feb. 11, 2020

(65) Prior Publication Data
US 2021/0247418 A1    Aug. 12, 2021

(51) Int. Cl.
| | |
|---|---|
| *G01P 15/125* | (2006.01) |
| *G01P 15/13* | (2006.01) |
| *G01P 15/08* | (2006.01) |
| *G01P 1/00* | (2006.01) |
| *H01F 1/057* | (2006.01) |

(52) U.S. Cl.
CPC ............ *G01P 15/132* (2013.01); *G01P 1/006* (2013.01); *G01P 15/0802* (2013.01); *G01P 15/125* (2013.01); *H01F 1/057* (2013.01); *G01P 2015/0817* (2013.01)

(58) Field of Classification Search
CPC .... G01P 1/006; G01P 15/0802; G01P 15/125; G01P 15/132; G01P 2015/0817; H01F 1/057
See application file for complete search history.

(56) References Cited

U.S. PATENT DOCUMENTS

| | | |
|---|---|---|
| 3,323,372 A | 6/1967 | Kistler et al. |
| 3,438,266 A | 4/1969 | Carow et al. |
| 3,635,298 A | 1/1972 | Kistler |
| (Continued) | | |

FOREIGN PATENT DOCUMENTS

| | | |
|---|---|---|
| CN | 102998481 | 3/2013 |
| EP | 0273048 B1 | 5/1993 |
| (Continued) | | |

OTHER PUBLICATIONS

U.S. Appl. No. 16/787,777, by Honeywell Aerospace (Inventors: Dwyer et al.), filed Feb. 11, 2020.
(Continued)

*Primary Examiner* — David J Bolduc
(74) *Attorney, Agent, or Firm* — Shumaker & Sieffert, P.A.

(57) ABSTRACT

The disclosure describes a magnetic circuit assembly that includes a magnet assembly and an excitation ring. The magnet assembly defines a central axis and includes a pole piece and a magnet underlying the pole piece. The excitation ring includes a base and an outer ring positioned around the magnet assembly. The base includes a platform layer underlying the magnet, an upper base layer underlying the platform layer, and a lower base layer underlying the upper base layer. The outer ring overlies the upper base layer and is configured to couple to an outer radial portion of a proof mass assembly. The platform layer and lower base layer are made from high coefficient of thermal expansion (CTE) materials, while the upper base layer and outer ring are made from low CTE materials. Each relatively high CTE material has a higher CTE than each relatively low CTE material.

20 Claims, 5 Drawing Sheets

(56) References Cited

U.S. PATENT DOCUMENTS

| | | | |
|---|---|---|---|
| 3,702,073 A | 11/1972 | Jacobs | |
| 4,320,412 A * | 3/1982 | Hynes | H01L 23/49562 |
| | | | 257/677 |
| 4,592,234 A * | 6/1986 | Norling | G01P 15/132 |
| | | | 73/497 |
| 4,658,647 A * | 4/1987 | Shintani | G01P 1/006 |
| | | | 73/497 |
| 4,697,455 A | 10/1987 | Norling | |
| 4,726,228 A | 2/1988 | Norling | |
| 4,854,169 A * | 8/1989 | Sakuma | G01P 1/006 |
| | | | 73/497 |
| 4,872,342 A | 10/1989 | Hanson | |
| 5,109,693 A | 5/1992 | Hojo et al. | |
| 5,111,694 A * | 5/1992 | Foote | G01P 15/132 |
| | | | 73/497 |
| 5,182,949 A | 2/1993 | Rupnick et al. | |
| 5,186,053 A | 2/1993 | Egley et al. | |
| 5,212,984 A | 5/1993 | Norling et al. | |
| 5,532,665 A * | 7/1996 | Foote | G01P 1/006 |
| | | | 335/296 |
| 5,557,044 A * | 9/1996 | Foote | G01P 1/006 |
| | | | 73/497 |
| 5,856,772 A | 1/1999 | Foote et al. | |
| 6,335,845 B1 | 1/2002 | Yamaguchi et al. | |
| 6,422,076 B1 | 7/2002 | Prokofiev et al. | |
| 7,100,447 B2 | 9/2006 | Dwyer | |
| 7,191,654 B2 | 3/2007 | Dwyer et al. | |
| 7,926,348 B2 | 4/2011 | Dwyer | |
| 8,215,169 B2 | 7/2012 | Roehnelt | |
| 8,528,405 B2 | 9/2013 | Jenkins et al. | |
| 9,016,126 B2 * | 4/2015 | Dwyer | G01P 15/0802 |
| | | | 73/514.32 |
| 9,488,671 B2 | 11/2016 | Levy | |
| 9,658,244 B2 * | 5/2017 | Dwyer | B32B 37/12 |
| 9,784,759 B2 | 10/2017 | Cox | |
| 10,161,956 B2 | 12/2018 | Dwyer | |
| 2003/0188578 A1 | 10/2003 | Ando | |
| 2006/0117853 A1 * | 6/2006 | Dwyer | G01P 15/132 |
| | | | 73/514.17 |
| 2009/0205424 A1 | 8/2009 | Roehnelt et al. | |
| 2009/0261691 A1 * | 10/2009 | Maeda | H01L 23/10 |
| | | | 310/348 |
| 2014/0109673 A1 | 4/2014 | Roehnelt et al. | |
| 2014/0374847 A1 * | 12/2014 | Hrovat | B81B 3/0016 |
| | | | 257/415 |
| 2017/0010297 A1 * | 1/2017 | Dwyer | G01P 15/125 |
| 2017/0115321 A1 | 4/2017 | Dwyer et al. | |
| 2017/0307653 A1 * | 10/2017 | Dwyer | G01P 15/132 |
| 2020/0072862 A1 * | 3/2020 | Dwyer | G01P 1/006 |

FOREIGN PATENT DOCUMENTS

| | | |
|---|---|---|
| EP | 3159702 A1 | 4/2017 |
| EP | 3239724 A1 | 11/2017 |
| JP | H08292208 A | 11/1996 |
| JP | 2002168878 A | 6/2002 |
| JP | 2011174901 A | 9/2011 |
| RU | 2485524 C2 | 6/2013 |

OTHER PUBLICATIONS

"Alloy 49 Technical Data," Invar 49 Tech Data, High Temp Metals, accessed from http://www.hightempmetals.com/techdata/hitemplnvar49data.php, accessed on Aug. 22, 2019, 7 pp.

Extended Search Report from counterpart European Application No. 21153872.3, dated Jul. 2, 2021, 9 pp.

Response to the Extended Search Report dated Jul. 2, 2021, from counterpart European Application No. 21153872.3, filed Aug. 6, 2021, 28 pp.

* cited by examiner

MULTILAYER EXCITATION RING

TECHNICAL FIELD

The present disclosure relates to systems and techniques for reducing thermally-induced stress in transducers.

BACKGROUND

A transducer may detect a directional stimulus along an input axis and translate that stimulus into a measurement signal. The transducer may detect the directional stimulus by detecting displacement of a proof mass assembly along the input axis. The proof mass assembly may be positioned between two magnetic circuit assemblies that each produce a magnetic field, and coils on the proof mass assembly may interact with the magnetic field. During operation, the proof mass assembly may be subject to various conditions that reduce an accuracy of the transducer. For example, the proof mass assembly and the magnetic circuit assemblies may have different coefficients of thermal expansion (CTE) that result in different amounts of expansion in response to a temperature change. These different amounts of expansion may create stresses that warp the proof mass assembly. To account for deviations in sensor output caused by these temperature-induced stresses, the sensor may have a bias temperature coefficient (BTC) and a bias thermal hysteresis (BTH) that quantify how much the sensor output may shift due to the change in temperature. However, high amplitude and variability of the BTC and BTH may reduce accuracy of the sensor output.

SUMMARY

Multi-layer excitation rings described herein may be utilized as part of a transducer, such as an accelerometer, to improve an accuracy of the transducer by reducing stresses between measurement components. A transducer includes a pair of magnetic circuit assemblies and a proof mass assembly positioned between the magnetic circuit assemblies. Each magnetic circuit assembly includes a magnet for generating a magnetic field and an excitation ring for providing a magnetic return path of the magnetic field. The excitation ring is coupled to both the magnet and an outer radial portion of the proof mass assembly. A temperature change of the transducer may produce radial stresses between the excitation ring and either magnet or the proof mass assembly due to CTE mismatches between the excitation ring and the respective magnet or proof mass assembly.

In some examples, the excitation ring includes a multilayer base underlying the magnet and an outer ring overlying the base and surrounding the magnet. The multilayer base includes a platform layer directly underlying the magnet and an upper base layer underlying the platform layer and the outer ring. The platform layer has a relatively high CTE that is substantially similar to a CTE of the magnet, thereby reducing a CTE mismatch between the magnet and the platform layer and, correspondingly, radial stresses at an interface between the magnet and the platform layer. As a result, the magnet may be coupled to platform layer with a reduced bond line corresponding to a lower adhesion threshold, thereby creating reduced variation in magnetic flux through the interface between the magnet and the platform layer.

The outer ring and the upper base layer may have a relatively low CTE that is substantially similar to a CTE of the proof mass assembly, thereby reducing radial stresses on the proof mass assembly. However, the relatively high CTE of the platform layer and a relatively low CTE of the upper base layer may cause the base to axially distort (e.g., bow). To counteract this distortion, the base may include a lower base layer underlying the upper base layer that has a relatively high CTE. The relatively high CTEs of the platform layer and the lower base layer axially balance the relatively low CTE of the upper base layer, such that an upper surface of the outer ring may substantially maintain planarity. As a result, the excitation ring may exert reduced radial stresses on the proof mass assembly, thereby improving accuracy of the transducer.

In some examples, the disclosure describes a magnetic circuit assembly that includes a magnet assembly and an excitation ring. The magnet assembly defines a central axis and includes a pole piece and a magnet underlying the pole piece. The excitation ring includes a base and an outer ring positioned around the magnet assembly. The base includes a platform layer underlying the magnet, an upper base layer underlying the platform layer, and a lower base layer underlying the upper base layer. The outer ring overlies the upper base layer and is configured to couple to an outer radial portion of a proof mass assembly. The platform layer, lower base layer, and magnet are made from relatively high coefficient of thermal expansion (CTE) materials, while the upper base layer and the outer ring are made from relatively low CTE materials. Each relatively high CTE material has a higher CTE than each relatively low CTE material.

In some examples, the disclosure describes a transducer that includes an upper magnetic circuit assembly, a lower magnetic circuit assembly, and a proof mass assembly positioned between the upper and lower magnetic circuit assemblies. Each of the upper and lower magnetic circuit assemblies includes a magnet assembly and an excitation ring. The magnet assembly includes defines a central axis and includes a pole piece and a magnet underlying the pole piece. The excitation ring includes a base and an outer ring positioned around the magnet assembly. The base includes a platform layer underlying the magnet, an upper base layer underlying the platform layer, and a lower base layer underlying the upper base layer. The outer ring overlies the upper base layer and is configured to couple to an outer radial portion of a proof mass assembly. The platform layer and lower base layer are made from relatively high coefficient of thermal expansion (CTE) materials, while the upper base layer and outer ring are made from relatively low CTE materials. Each relatively high CTE material has a higher CTE than each relatively low CTE material.

In some examples, the disclosure describes a method of forming a magnetic circuit assembly that includes forming an upper base layer and an outer ring overlying the upper base layer. Each of the upper base layer and the outer ring are made from relatively low CTE materials. The method further includes forming a platform layer on an upper surface of the upper base layer and a lower base layer on a lower surface of the upper base layer to form an excitation ring. Each of the platform layer and the lower base layer are made from relatively high CTE materials. The method further includes forming a magnet and a pole piece on an upper surface of the platform layer. Each relatively high CTE material has a higher CTE than each relatively low CTE material.

BRIEF DESCRIPTION OF THE FIGURES

The details of one or more examples are set forth in the accompanying drawings and the description below. Other features, objects, and advantages will be apparent from the description and drawings, and from the claims.

DETAILED DESCRIPTION

Figure 1A:
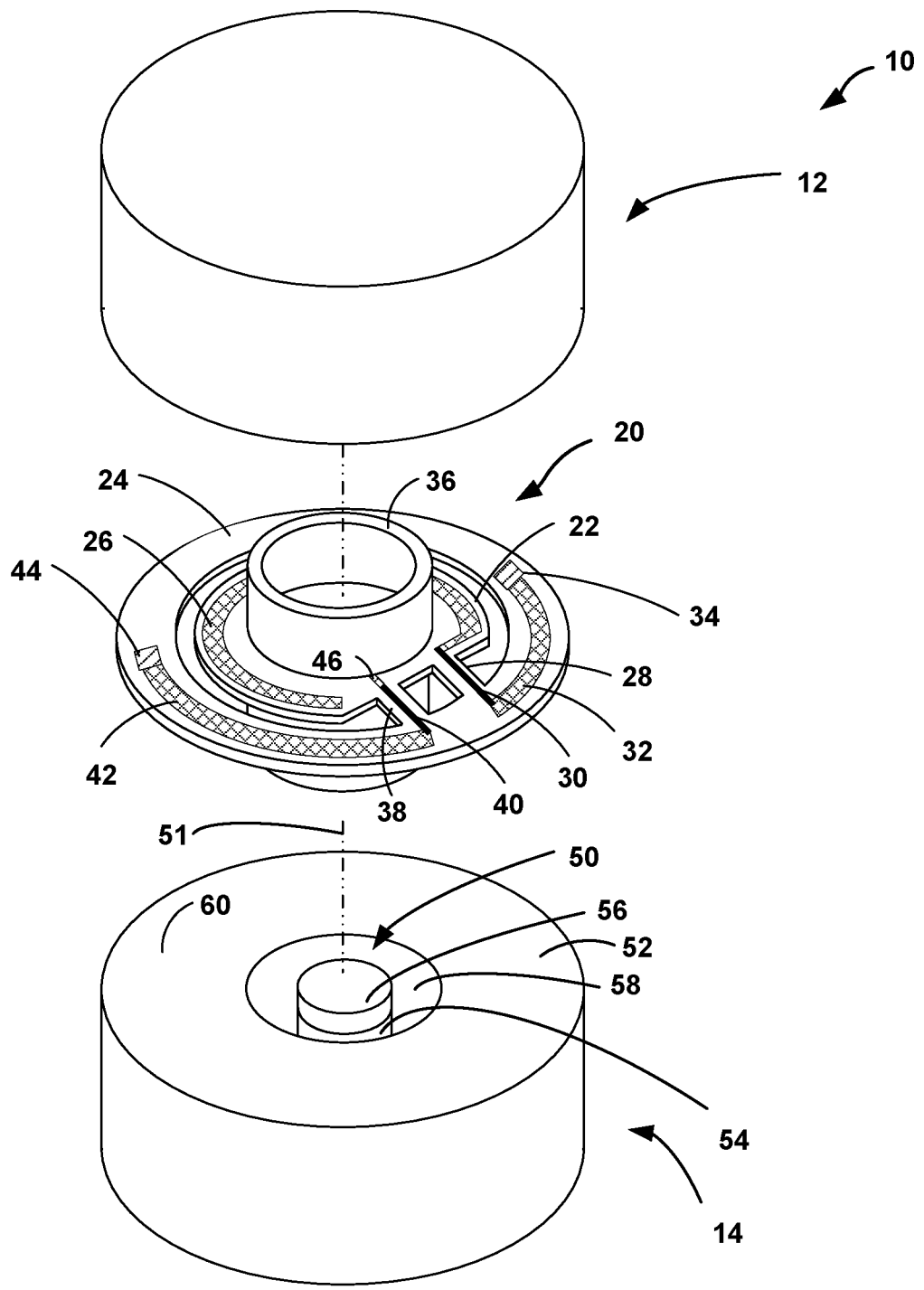
FIG. 1A is an exploded view diagram illustrating an example transducer.

FIG. 1A is an exploded view diagram illustrating an example transducer 10 (e.g., a force rebalance accelerometer) that includes an upper magnetic circuit assembly 12, a lower magnetic circuit assembly 14 (e.g., collectively "upper and lower magnetic circuit assemblies 12 and 14"), and a proof mass assembly 20 positioned between upper and lower magnetic circuit assemblies 12 and 14. Proof mass assembly 20 may include a proof mass 22, a support structure 24, and a first flexure 28 and a second flexure 38 (collectively "flexures 28 and 38") flexibly connecting proof mass 22 to support structure 24.

Support structure 24 may provide structural support for proof mass 22 and help maintain separation between proof mass 22 and upper and lower magnetic circuit assemblies 12 and 14. Although support structure 24 as shown in FIG. 1 is a circular shape, support structure 24 may be any shape (e.g., square, rectangular, oval, or the like) and may or may not surround proof mass 22. Proof mass 22 may be flexibly coupled to support structure 24 using one or more flexures 28 and 38 to support proof mass 22 within support structure 24 and enable proof mass 22 to move about the plane defined by support structure 24. For example, flexures 28 and 38 may be stiff in a radial direction (e.g., perpendicular to a central axis 51) and flexible in a vertical direction (e.g., along central axis 51), such that flexures 28 and 38 allow proof mass 22 to move in a direction substantially orthogonal (e.g., orthogonal or nearly orthogonal) to a plane defined by support structure 24 due to acceleration of transducer 10. Support structure 24 may include mounting pads 34 and 44 and one or more electrical traces 32 and 42. Flexures 28 and 38 may contain one or more thin film leads 30 and 40 on an upper or lower surface of the respective flexure of flexures 28 and 38 configured to transmit an electrical signal across the respective flexure.

In the example of FIG. 1A, proof mass assembly 20 may be clamped by magnetic circuit assemblies 12 and 14 at an outside diameter of proof mass assembly 20. Upper and lower magnetic circuit assemblies 12 and 14 may be attached (e.g., clamped) to opposite sides of proof mass assembly 20 using one or more of the respective mounting pads (e.g., mounting pads 34 and 44). Mounting pads 34 and 44 may be positioned at various locations on support structure 24, and may take on any form or shape and be present in any quantity. In some examples, mounting pads 34 and 44 may be raised such that when transducer 10 is fully assembled, mounting pads 34 and 44 may contact upper and lower magnetic circuit assemblies 12 and 14 to separate proof mass assembly 20 from upper and lower magnetic circuit assemblies 12 and 14, as well as provide mounting support for proof mass assembly 20. For example, a height of mounting pads 34 and 44 may define capacitive gaps between upper and lower magnetic circuit assemblies 12 and 14 and upper and lower capacitance pick-off plates (e.g., upper capacitance pick-off plate 26) on proof mass 22. In some examples, mounting pads 34 and 44 may be made of a piezoelectric material, such as quartz ($SiO_2$), Berlinite ($AlPO_4$), gallium orthophosphate ($GaPO_4$), thermaline, barium titanate ($BaTiO_3$), or lead zirconate titanate (PZT), zinc oxide (ZnO), or aluminum nitride (AlN), etc.

Proof mass 22 may include one or more capacitance pick-off plates (e.g., upper capacitance pick-off plate 26) and one or more force-rebalance coils (e.g., upper force-rebalance coil 36) mounted on upper and/or lower surfaces of proof mass 22. In some examples, upper capacitance pick-off plate 26 and upper force-rebalance coil 36 may be configured to interact with upper magnetic circuit assembly 12 to measure the acceleration applied to transducer 10. For example, as acceleration is applied to transducer 10, proof mass 22 may deflect from a null position, causing a distance of the capacitance gap between upper capacitance pick-off plate 26 and the inwardly facing surface of upper magnetic circuit assembly 12 to change (e.g., increase or decrease), resulting in a change in a capacitance and, correspondingly, a change in a capacitance measurement. In some examples, the change in the capacitance may be used to determine the amount of acceleration applied to transducer 10.

Additionally or alternatively, transducer 10 may be configured to apply an electrical current to upper force-rebalancing coil 36 (e.g., through thin film lead 40) based on the change in the capacitance, such that upper force-rebalancing coil 36 in conjunction with a magnetic pole piece of upper magnetic circuit assembly 12 acts as a servo to maintain the position of proof mass 22 at a null position. A current applied to upper force-rebalancing coil 36 to maintain proof mass 22 at the null position may be used to determine an amount of directional stimulus, such as acceleration, applied to transducer 10. For example, a magnitude of the current to rebalancing coils 36 may be a measure of acceleration of proof mass 22 along central axis 51. While the disclosure describes the operation of transducer 10 in terms of upper capacitance pick-off plate 26 and upper force-rebalance coil 36, such descriptions may equally apply to the use of a lower capacitance pick-off plate and lower force-rebalance coil, combinations of upper and lower capacitance pick-off plates and lower force-rebalance coils.

Components of proof mass assembly 20, such as support structure 24 and proof mass 22, may be formed using any suitable material. In some examples, proof mass assembly 20 may be made of a piezoelectric material, such as quartz ($SiO_2$), Berlinite ($AlPO_4$), gallium orthophosphate ($GaPO_4$), thermaline, barium titanate ($BaTiO_3$), or lead zirconate titanate (PZT), zinc oxide (ZnO), or aluminum nitride (AlN), etc. In some examples, proof mass assembly 20 may be made from a relatively low CTE material. A relatively low CTE material may be a material having a CTE less than or equal to about 3 ppm/° C. For example, proof mass assembly may be manufactured from fused silica having a CTE of about 0.5 ppm/° C.

Upper and lower magnetic circuit assemblies 12 and 14 each include a magnet assembly 50 and an excitation ring 52 (not labeled for upper magnetic circuit assembly 12). Magnet assembly 50 defines central axis 51 through transducer

10. Magnet assembly 50 includes a pole piece 56 and a magnet 54 underlying pole piece 56. Magnet 54 may be configured to provide a magnetic field to drive magnetic circuits of lower magnetic circuit assembly 14. In some examples, magnet 54 may be made of Alnico, samarium-cobalt, neodymium-iron-boron, iron-chromium-cobalt, metal oxide-ferrite (Spinel), or other such materials. In some examples, magnet 54 may be manufactured from a relatively high CTE material. A relatively high CTE material may have a CTE higher than a relatively low CTE material, such as a relatively low CTE material of upper base layer 68 or outer ring 62. A relatively high CTE material may be, for example, a material having a CTE greater than 8 ppm/° C. For example, magnet 54 may be manufactured from alnico, having a CTE of about 11 ppm/° C.

Excitation ring 52 may be configured to provide a magnetic return path for the magnetic field generated by magnet 54. For example, as will be shown further in FIG. 1B, excitation ring 52 may have a generally cylindrical shape with a "C" cross section. Pole piece 56 may be a magnetic structure that focuses a magnetic field created by magnet 54 to drive upper magnetic circuit assembly 12. For example, pole piece 56 may direct the magnetic field to flow through force rebalancing coils 36. By directing the magnetic field through force-rebalancing coils 36, the magnetic field may enter excitation ring 52 and flow around to the opposite side of magnet 54 through excitation ring 52, and flow back through magnet 54 to pole piece 56, completing the magnetic circuit. In some examples, excitation ring 52 may be manufactured from materials having relatively high relative magnetic permeability, such as a maximum relative magnetic permeability greater than about 1500. In some examples, excitation ring 52 may be manufactured from materials that saturate at relatively high magnetic flux densities, such as greater than 5000 gausses.

In some examples, upper and lower magnetic circuit assemblies 12 and 14 may include inwardly (i.e., toward proof mass assembly 20) facing surfaces 60 configured to interact with portions of proof mass assembly 20. Upper and lower magnetic circuit assemblies 12 and 14 may also include a coil gap 58 along a respective inwardly facing surface with magnet assembly positioned therein. Coil gap 58 may be configured to receive force-rebalancing coils 36 of proof mass assembly 20. In some examples, at least a portion of excitation ring 52 may be manufactured from a material having a relatively high relative magnetic permeability to provide a magnetic return path, such as invar or super invar.

As noted above, materials of proof mass assembly 20 and magnetic circuit assemblies 12 and 14 may have different coefficients of thermal expansion (CTE). For example, magnet 54 may be manufactured from alnico or another material having a relatively high magnetic field strength, while proof mass assembly 20 may be manufactured from fused quartz or another material having a high elastic behavior. For example, proof mass assembly 20 may deform from an original state to a flexed state in response to an applied stress and return to the original state once the applied stress is removed. Selecting materials for magnet 54 and/or proof mass assembly 20 based primarily on a similar CTE may result in a compromise in the important properties of magnet 54 and/or proof mass assembly 20. In some instances, a CTE of magnet 54 may be substantially higher than a CTE of proof mass assembly 20; for example, a CTE of alnico may be about 11 ppm/° C., while a CTE of fused silica may be about 0.5 ppm/° C. As a result, a homogeneous excitation ring may create substantial differences in CTE between excitation ring 52 and magnet 54 and/or between excitation ring 52 and proof mass assembly 20. When transducer 10 undergoes changes in temperature, the differences in CTE between magnet 54 and excitation ring 52 and/or between excitation ring 52 and proof mass assembly 20, may create radial stresses that distort or displace proof mass assembly 20 and/or may be mitigated through mechanisms that distort a magnetic flux through excitation ring 52. For example, a change in length caused by thermal expansion may be represented by Equation 1 below:

$$\Delta L = L\alpha \Delta T \quad \text{(Equation 1)}$$

In Equation 1 above, a change in length ($\Delta L$) may be equal to a length (L) of each component (e.g., a cross-sectional diameter of proof mass assembly 20 and/or a diameter of magnetic circuit assemblies 12 and 14) multiplied by a CTE ($\alpha$) of the material of the component and a change in temperature ($\Delta T$) of the component. Excitation ring 52 may have a higher CTE than proof mass assembly 20 and, in response to the increase in temperature, exert outward radial stresses on proof mass assembly 20. As a result, radial stresses on proof mass assembly 20 may increase with increasing temperature as a diameter of transducer 10 increases. If proof mass assembly 20 isn't substantially symmetrical, proof mass assembly 20 may bow axially in response to the outward radial stresses. A friction coefficient and normal force between proof mass assembly 20 and excitation ring 52 may be overcome by the outward radial stresses, such that mounting pads 34, 44 may slip and change a stress state of proof mass assembly 20.

Figure 1B:
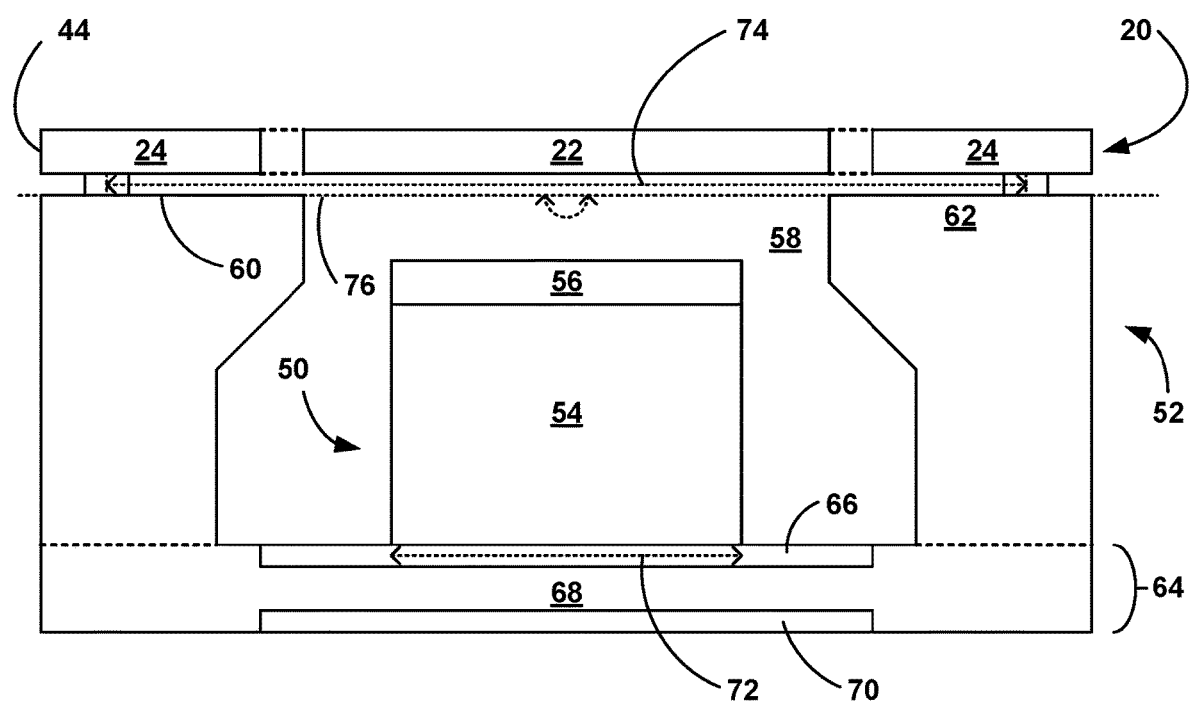
FIG. 1B is a cross-sectional side view diagram illustrating an example magnetic circuit assembly and proof mass assembly.

As discussed herein, excitation ring 52 may be configured to reduce radial stresses between excitation ring 52 and proof mass assembly 20 and/or radial stresses between excitation ring 52 and magnet 54 by incorporating multiple layers or sections of dissimilar materials into excitation ring 52. FIG. 1B is a cross-sectional side view diagram illustrating an example upper or lower magnetic circuit assembly 12 or 14 and proof mass assembly 20. Excitation ring 52 includes an outer ring 62 positioned around magnet assembly 50 and a base 64 underlying magnet assembly 50. While shown in FIG. 1B as a monolithic unit, in other examples, outer ring 62 and base 64 may be separate components.

Base 64 includes a platform layer 66 underlying magnet 54, an upper base layer 68 underlying platform layer 66 and outer ring 62, and a lower base layer 70 underlying upper base layer 68. Platform layer 66 may be coupled to magnet 54 using an adhesive layer (not shown). In some examples, the adhesive layer may be a conductive adhesive layer, such as a conductive epoxy. The adhesive layer may absorb radial stresses (e.g., shear stresses) between platform layer 66 and magnet 54.

To reduce radial stresses between platform layer 66 and magnet 54, platform layer 66 may be configured such that radial expansion 72 of a portion of platform layer 66 over an anticipated temperature operating range (e.g., an ordinary operating range of transducer 10) may be substantially similar to radial expansion of magnet 54 over the anticipated temperature operating range. As a result, a shear stress between magnet 54 and platform layer 66 may be reduced.

In some examples, a composition of platform layer 66 may be selected to substantially match a CTE of platform layer 66 to a CTE of magnet 54. To reduce a CTE mismatch between platform layer 66 and magnet 54, the material of platform layer 66 may have a CTE that is substantially similar to (e.g., within about 4 ppm/° C. at room temperature) a CTE of the material of magnet 54, such that radial stresses caused by a CTE mismatch between magnet 54 and excitation ring 52 may be reduced. In some examples, platform layer 66 includes a relatively high CTE material. A relatively high CTE material may be, for example, a material that has a CTE greater than or equal to 8 ppm/° C. As explained above, magnet 54 may be manufactured from a relatively high CTE material, such as alnico (11 ppm/° C.). In addition to a relatively high CTE, platform layer 66 may have a high relative magnetic permeability. A variety of materials may be used for platform layer 66 including, but not limited to, nickel-iron matrix materials having nickel content greater than about 40 percent, such as hipernom, and the like. In some examples, the nickel-iron matrix materials may have a nickel content greater than 75 percent, such as about 80 percent.

By reducing thermally-induced radial stress between platform layer 66 and magnet 54, excitation ring 52 may have an improved (i.e. reduced variation) magnetic flux profile. For example, a thickness of the adhesive layer between platform layer 66 and magnet 54 may correspond to a difference in thermal expansion between platform layer 66 and magnet 54, such that a lower difference in thermal expansion may result in a thinner adhesive layer. As the adhesive layer thickness decreases with reduced radial stresses, variation in reluctance of the magnetic return path of excitation ring 52 with temperature may decrease.

To reduce thermally-induced radial stresses between proof mass assembly 20 and outer ring 62, outer ring 62 and base 64 may be configured such that radial expansion 74 of outer ring 62 and base 64 over an anticipated temperature operating range may be substantially similar to radial expansion of proof mass assembly 20 over the anticipated temperature operating range (e.g., match a change in radial length of magnetic circuit assemblies 12, 14 to a change in radial length of proof mass assembly 20 over temperature). For example, two types of strain may occur at an interface between proof mass assembly 20 and outer ring 62 may include a radial strain and a conical strain. A radial strain from a mismatch of CTEs of proof mass assembly 20 and outer ring 62 may cause distortion due to an asymmetry in proof mass assembly 20. A coning strain caused by magnet 54 shrinking faster than platform layer 66 may cause a top surface of platform layer 68 to concave. Reducing a difference between radial expansion 74 of outer ring 62 and base 64 and radial expansion of proof mass assembly 20, such as by selecting a composition, diameter, and/or thickness of platform layer 68 and lower base layer 70, may reduce these radial and coning strains. As a result, stresses that may cause displacement or distortion of proof mass assembly 20 may be reduced.

In some examples, a composition of outer ring 62 and upper base layer 68 may be selected to substantially match a CTE of outer ring 62 and upper base layer 68 to a CTE of proof mass assembly 20, such that a difference between the CTE of the material of outer ring 62 and the CTE of upper base layer 68. To reduce a CTE mismatch between outer ring 62 and upper base layer 68 and proof mass assembly 20, the materials of outer ring 62 and upper base layer 68 may each have a CTE that is substantially similar to (e.g., within about 2 ppm/° C. at room temperature) a CTE of the material(s) of proof mass assembly 20, such that radial stresses caused by a CTE mismatch between magnet 54 and excitation ring 52 may be reduced. In some examples, outer ring 62 and upper base layer 68 include a relatively low CTE material. A relatively low CTE material may have a CTE lower than a relatively higher CTE material, such as a relatively high CTE material of platform layer 66, lower base layer 68, magnet 54, or pole piece 56. A relatively low CTE material may be, for example, a material that has a CTE less than or equal to about 3 ppm/° C. As explained above, proof mass assembly 20 may be manufactured from a relatively low CTE material, such as fused quartz (0.5 ppm/° C.).

In some examples, upper base layer 68 and outer ring 62 may include a same material. For example, while upper base layer 68 and outer ring 62 may be differentiated through a grain or other boundary, as indicated by the dashed line, upper base layer 68 and outer ring 62 may have substantially similar properties. In some examples, upper base layer 68 and outer ring 62 may be monolithic (i.e., without differentiation). For example, outer ring 62 and upper base layer 68 may be manufactured through casting or additive deposition, as will be described in FIG. 3A-3C below. A variety of materials may be used for outer ring 62 and/or upper base layer 68 including, but not limited to, invar, super invar, kovar, soft iron, and the like. In some examples, outer ring 62 and upper base layer 68 include a material having a relatively high relative magnetic permeability, such as a maximum relative magnetic permeability greater than about 1500.

In some examples, to reduce thermally-induced radial stresses between proof mass assembly 20 and outer ring 62, outer ring 62 and base 64 may be configured such that a plane 76 of surface 60 of outer ring 62 is substantially planar over an anticipated temperature operating range. For example, a component of radial expansion 74 may be caused by a bowing effect due to a difference in radial expansion between two adjacent layers. In base 64, radial stresses between platform layer 66 and upper base layer 68 may produce shear strain that, if not counteracted, by cause base 64 to bow outward and outer ring 62 to exert increase radial stress on proof mass assembly 20. In some examples, lower base layer 70 may include a relatively high CTE material. As explained above, platform layer 66 may include a relatively high CTE material. To balance (e.g., "common mode") an amount of radial stress exerted by platform layer 66 and lower base layer 70, the material of lower base layer 70 may have a CTE that is substantially similar to (e.g., within about 2 ppm/° C. at room temperature) a CTE of the material of platform layer 66. A variety of materials may be used for lower base layer 70 including, but not limited to, nickel-iron alloy material having a nickel concentration greater than about 40 percent, such as hipernom, and the like. In some examples, platform layer 66 and lower base layer 70 include a same material. For example, lower base layer 70 may compensate for strain incurred on outer ring 62 and upper base layer 68 by platform layer 66. In some instances, such common-moding of properties may be accomplished by using a same material for both platform layer 66 and lower base layer 70, with dimensional changes, such as a diameter or thickness, making up for the strain on platform layer 66 caused magnet 54.

By reducing thermally-induced radial stresses between proof mass assembly 20 and outer ring 62, proof mass assembly 20 may experience less distortion as a result of temperature changes and, as such, have reduced error. As one example, by selecting a relatively low CTE material for outer ring 62 and upper base layer 68 extending through excitation ring 52, excitation ring 52 may have an effective CTE that is substantially similar to proof mass assembly 20. As another example, by balancing a thermal strain between platform layer 66 and lower base layer 70, excitation ring 52 may reduce or eliminate any bowing of base 64 in response to thermal changes.

While described in terms of CTE, in some examples, materials of platform layer 66, upper base layer 68, lower base layer 70, and outer ring 62 may be selected for other properties related to an amount of radial stress between excitation ring 52 and either of magnet 54 or proof mass assembly 20. For example, in addition to a CTE mismatch between layers, a shear stress between two layers, such as platform layer 66 and upper base layer 68, may be related to an elasticity of each layer. As a temperature increases, a shear stress is created at an interface between magnet 54 and platform layer 66, and thereby between platform layer 66 and upper base layer 68, which may result in a deflection of platform layer 66. As such, upper base layer 68 and lower base layer 70 may be configured to produce a similar and opposite shear stress to reduce or prevent substantial deflection of platform layer 66. To control an amount of radial expansion 74, a material of platform layer 66, upper base layer 68, and/or lower base layer 70 may be selected to have an elasticity and CTE such that a shear stress between platform layer 66 and upper base layer 68 and/or a shear stress between upper base layer 68 and lower base layer 70 may be substantially similar. As a result, base 64 may not substantially bend in response to a change in temperature.

In addition or alternative to excitation ring 52, in some examples, other components of magnetic circuit assemblies 12 and 14 may be configured with particular thermal expansion properties or configurations to reduce radial stress between components of transducer 10. In some examples, a composition of pole piece 56 and/or magnet 54 may be selected to substantially match a CTE of pole piece 56 to a CTE of magnet 54. To reduce a CTE mismatch between pole piece 56 and magnet 54, pole piece 56 may have a CTE that is substantially similar to (e.g., within about 2 ppm/° C. of) a CTE of magnet 54, such that radial stresses caused by a CTE mismatch between magnet 54 and pole piece 56 may be reduced. In some examples, pole piece 56 includes a relatively high CTE material. As explained above, magnet 54 may be manufactured from a high relatively CTE material, such as alnico (11 ppm/° C.). In addition to a relatively high CTE, pole piece 56 may have a relatively high relative magnetic permeability. A variety of materials may be used for pole piece 56 including, but not limited to, nickel-iron alloy material having a nickel concentration greater than about 40 percent, such as hipernom, and the like.

In some examples, magnetic circuit assemblies 12 and 14 may be configured to increase axial expansion (e.g., along central axis 51) of magnet assembly 50 with respect to outer ring 62. For example, as a temperature of transducer 10 changes, a distance of coil gaps 58 may change due to a difference in CTE between outer ring 62 and pole piece 56. To compensate for this change in coil gaps 58, magnet 54 and pole piece 56 may each have a relatively high CTE, such that magnet assembly 50 has an effective axial CTE that is greater than an axial CTE of outer ring 62. If pole piece 56 has a higher CTE than outer ring 62, coil gaps 58 may get smaller as the temperature rises. As such, as a temperature increases, a size of coil gaps 58 may decrease, thereby compensating for a reduction in magneto-motive force and reducing a scale factor temperature coefficient of transducer 10.

Figure 2A:
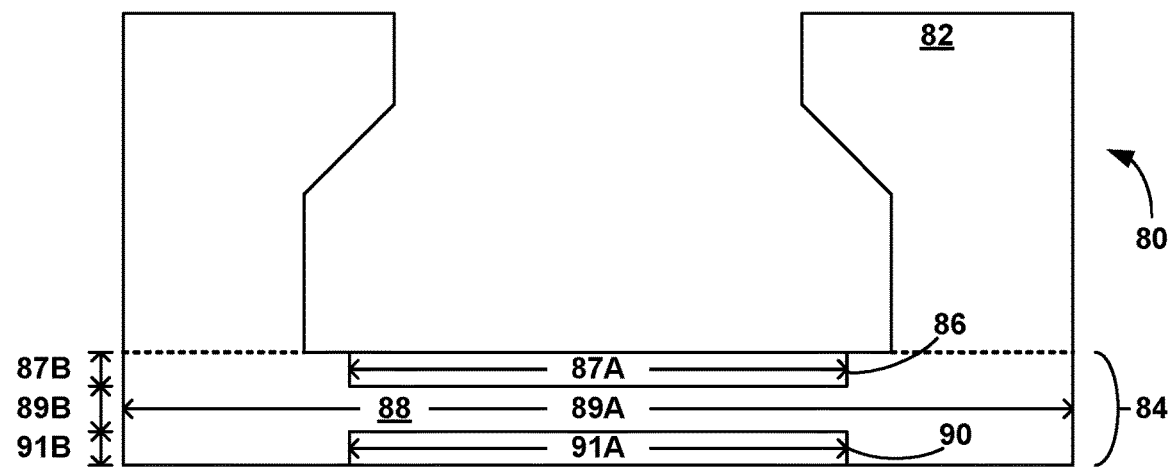
FIG. 2A is a cross-sectional side view diagram illustrating an example excitation ring.
Figure 2B:
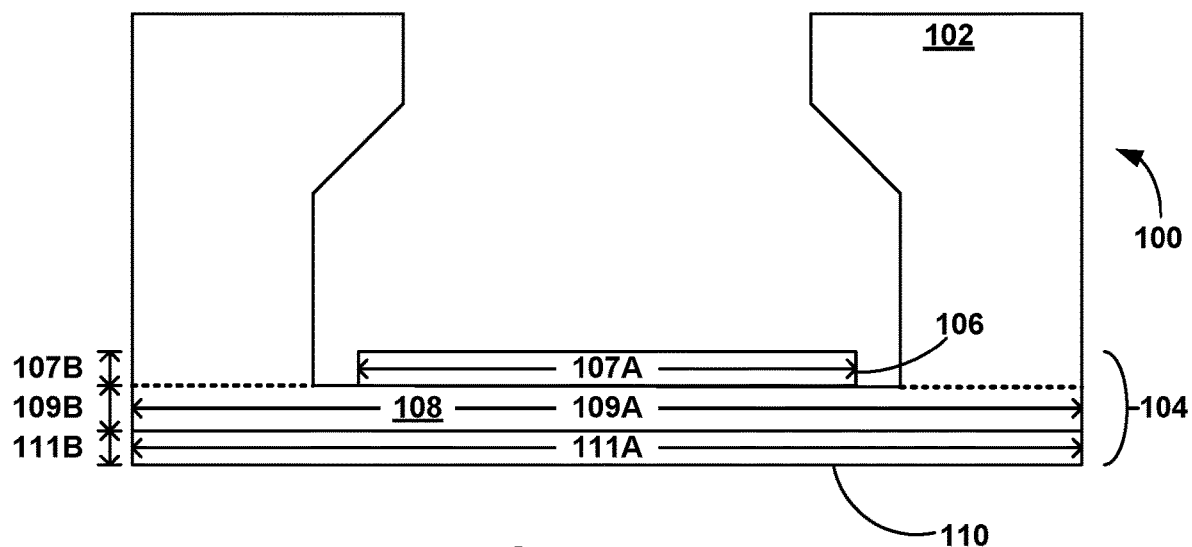
FIG. 2B is a cross-sectional side view diagram illustrating an example excitation ring.

As described above, a composition of excitation ring 52 may be configured to reduce radial stress between excitation ring 52 and each of proof mass assembly 20 and magnet 54. In some examples, a dimension and/or distribution of excitation ring 52 may be configured to reduce radial stress between excitation ring 52 and each of proof mass assembly 20 and magnet 54. For example, an amount of shear strain between two adjacent layers may be related to a thickness of the layers and a length of an interface between the two layers. FIGS. 2A and 2B are cross-sectional side view diagrams illustrating example magnetic circuit assemblies and proof mass assemblies. FIG. 2A illustrates an example excitation ring 80 that includes inset layers, while FIG. 2B illustrates an example excitation ring 100 that includes offset layers. Components of FIGS. 2A and 2B may be similar to similarly named components described in FIGS. 1A and 1B.

In the example of FIG. 2A, excitation ring 80 includes an outer ring 82 and a base 84 configured to couple to a magnet assembly, such as magnet assembly 50. Base 84 includes a platform layer 86 configured to couple to a magnet, such as magnet 54, an upper base layer 88 underlying platform layer 86 and outer ring 82, and a lower base layer 90 underlying upper base layer 88. Each of platform layer 86 and lower base layer 90 may be inset within upper base layer 88, such that an upper surface of upper base layer 88 is in a same plane as an upper surface of platform layer 86 and a lower surface of upper base layer 88 is in a same plane as a lower surface of lower base layer 90. Upper base layer 88 may have a diameter 89A and thickness 89B. Diameter 89A may correspond to a diameter of excitation ring 80.

Platform layer 86 may have a diameter 87A and thickness 87B. Diameter 87A may be selected to interface with a magnet, such as magnet 54. For example, diameter 87A may be greater than or equal to a diameter of the magnet. Lower base layer 90 may have a diameter 91A and thickness 91B. Diameter 87A, thickness 87B, diameter 91A, and/or thickness 91B may be selected to reduce or eliminate bending of base 84 in response to a change in temperature. For example, as explained above, a stress between adjacent layers may be related to a CTE of the adjacent layer, a thickness of the adjacent layers, and a length of the adjacent layers. As such, diameter 87A, thickness 87B, diameter 91A, and/or thickness 91B may be selected to balance a radial stress created by platform layer 86 and lower base layer 90, such that base 84 may have reduced bending. As diameter 87A and diameter 91A each increase, a flux density emerging from an outside radius drops off at a circumference of the respective layer. In some examples, diameter 87A and/or diameter 91A may be greater than about 0.3 inches, such as about 0.37 inches. In some examples, to reduce or prevent saturation when transferring into a lower permeability material of outer ring 62 and/or upper base layer 68, diameter 87A and/or diameter 91A may be greater than about 0.4 inches, such as about 0.425 inches. In some examples, a ratio of diameter 87A of platform layer 86 to diameter 91A of lower base layer 90 may be between about 0.5 and about 2. In some examples, a ratio of thickness 87B of platform layer 86 to thickness 91B of lower base layer 90 at a central axis may be between about 0.5 and about 2.

In the example of FIG. 2B, excitation ring 100 includes an outer ring 102 and a base 104 configured to couple to a magnet assembly, such as magnet assembly 50. Base 104 includes a platform layer 106 configured to couple to a magnet, such as magnet 54, an upper base layer 108 underlying platform layer 106 and outer ring 102, and a lower base layer 110 underlying upper base layer 108. Each of platform layer 106 and lower base layer 110 may be offset from upper base layer 108, such that an upper surface of upper base layer 108 is in a different plane as an upper surface of platform layer 106 and a lower surface of upper base layer 108 is in a different plane as a lower surface of lower base layer 110. Platform layer 106 may have a diameter 107A and thickness 107B, upper base layer 88 may have a diameter 109A and thickness 109B, and lower base layer 110 may have a diameter 111A and thickness 111B. Diameter 107A, thickness 107B, diameter 109A, thickness 109B, diameter 111A, and thickness 111B may be selected using similar considerations described with respect to diameter 87A, thickness 87B, diameter 89A, thickness 89B, diameter 91A, and thickness 91B of FIG. 2A above.

An applied force to a component may be equal to Young's modulus times a cross-sectional area of the component times a deformation divided by a length of the component. To determine improved dimensions of platform layer 66, upper base layer 68, and/or lower base layer 70, such as diameters 87A, 89A, and/or 91A and thicknesses 87B, 89B, and 91B, a structural analysis may be run by varying shapes and material properties of platform layer 66, upper base layer 68, and lower base layer 70 and observing a flatness of a top of outer ring 62 over temperature.

In some examples, inset layers, such as described in FIG. 2A, may permit use of a larger magnet 54 and/or pole piece 56 and/or improve a linearity of a magnetic field at a coil of proof mass assembly 20. In some examples, offset layers, such as described in FIG. 2B, may permit easier manufacturing, as the layers may be deposited without consideration of radial fit and/or radial end forces.

Figure 3A:
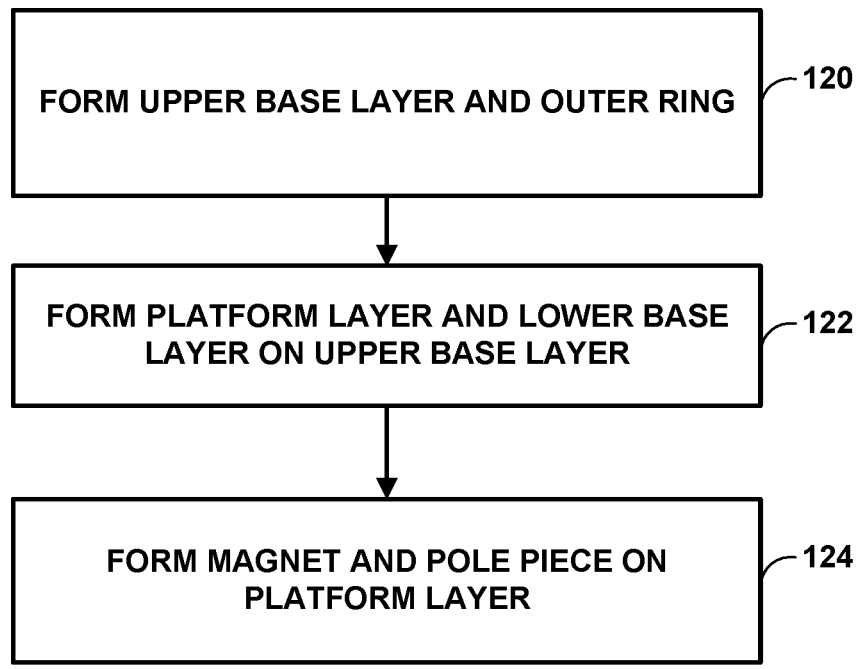
FIG. 3A is a flowchart illustrating an example method of manufacturing a transducer.

FIG. 3A is a flowchart illustrating an example method of manufacturing a magnetic circuit assembly. The techniques of FIG. 3A will be described with respect to FIGS. 1A and 1B; however, the techniques of FIG. 3A may be used to manufacture other magnetic circuit assemblies. To select dimensions and compositions of platform layer 66, upper base layer 68, and/or lower base layer 70, a structural analysis may be run by varying shapes and material properties of platform layer 66, upper base layer 68, and lower base layer 70 and observing a flatness of a top of outer ring 62 over temperature.

The technique of FIG. 3A includes forming upper base layer 68 and outer ring 62 (120). Upper base layer 68 and outer ring 62 may be formed using a variety of techniques including, but not limited to: casting; additive manufacturing, such as additive deposition; subtractive manufacturing; and the like. In some examples, upper base layer 68 and outer ring 62 may be formed separately and joined, such as by welding, adhesion, or the like. In some examples, upper base layer 68 and outer ring 62 may be monolithic.

The technique of FIG. 3A includes forming platform layer 66 and lower base layer 70 on a surface of upper base layer 68 (122). For example, upper base layer 68 may include a top major surface and a bottom major surface. Platform layer 66 may be deposited on the top major surface of upper base layer 68 and lower base layer 70 may be deposited on the bottom major surface of upper base layer 68. Platform layer 66 and lower base layer 70 may be formed on upper base layer 68 using a variety of techniques including, but not limited to, casting; additive manufacturing, such as additive deposition; subtractive manufacturing; and the like.

Figure 3B:
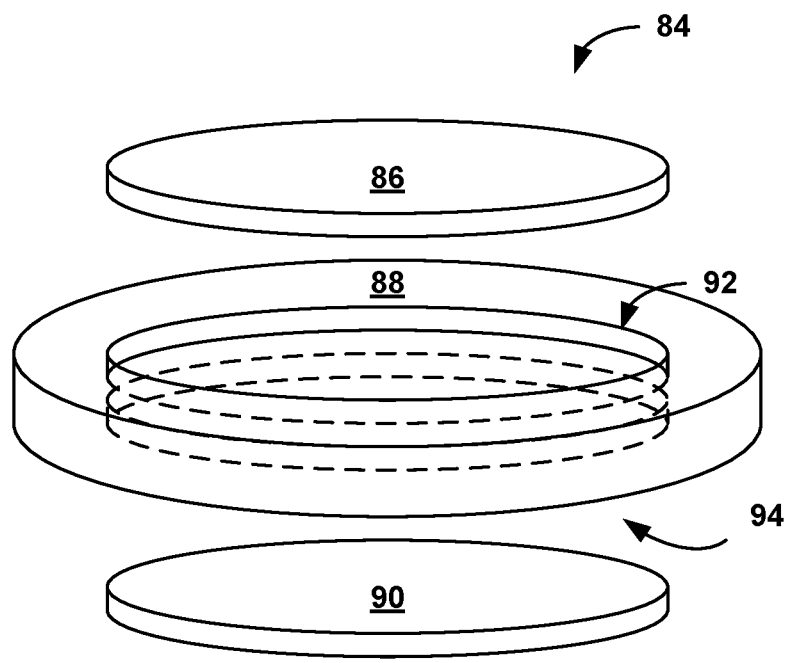
FIG. 3B is an exploded view diagram of a base of an excitation ring formed using the example method of FIG. 3A.

In some examples, steps (120) and (122) may form an excitation ring having inset layers. FIG. 3B is an exploded view diagram of base 84 of excitation ring 80 of FIG. 2A formed using the example method of FIG. 3A. In the example of FIG. 3B, upper base layer 88 includes an upper cavity 92 and a lower cavity 94. To form platform layer 86 in upper cavity 92 and/or lower base layer 90 in lower cavity 94, a relatively high CTE material may be deposited into a respective upper cavity 92 and/or lower cavity 94 using any of a variety of additive manufacturing techniques, such as binder jet printing. For example, three-dimensional (3D) printing techniques, such as binder jet printing, may provide an ability to form upper base layer 88 and use upper base layer 88 as a surface to apply a different material with no additional material required to bond them together, such as an adhesive. For example, bonding materials may not be magnetic and may add reluctance to transducer 10. As a result, base 84 may be manufactured to a high tolerance and/or without intermediate bonding material between platform layer 86, upper base layer 88, and/or lower base layer 90. As another example, additive manufacturing techniques may enable a greater amount of control for local composition of platform layer 86 and/or lower base layer 90, thereby permitting fine tuning of CTE of platform layer 86 and/or lower base layer 90.

Figure 3C:
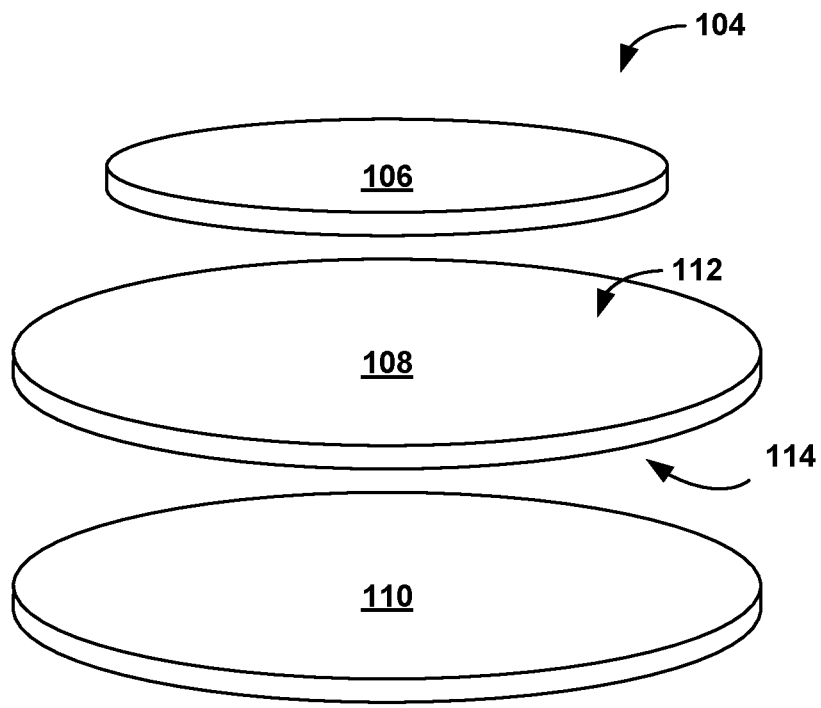
FIG. 3C is an exploded view diagram of a base of an excitation ring formed using the example method of FIG. 3A.

In some examples, steps (120) and (122) may form an excitation ring having inset layers. FIG. 3C is an exploded view diagram of base 104 of excitation ring 100 of FIG. 2B formed using the example method of FIG. 3A. In the example of FIG. 3C, upper base layer 108 includes an upper surface 112 and a lower surface 114. To form platform layer 106 on upper surface 112 and/or lower base layer 110 on lower surface 114, a relatively high CTE material may be deposited onto a respective upper surface 112 and/or lower surface 114 using any of a variety of manufacturing techniques. As a result, base 104 may be manufactured relatively inexpensively.

Referring back to FIG. 3A and FIGS. 1A and 1B, the technique of FIG. 3A includes forming a magnet and pole piece, such as magnet 54 and pole piece 56, on platform layer 66 (124). A variety of techniques may be used to form magnet 54 on platform layer 66 and/or pole piece 56 on magnet 54 including, but not limited to, welding, adhesion, additive manufacturing, and the like. In some examples, magnet 54 may be formed directly on platform layer 66 and/or pole piece 56 may be formed directly on magnet 54. For example, as discussed above, a CTE of each of magnet 54 and platform layer 66 may be substantially similar, such that magnet 54 may be formed on platform layer 66 and/or pole piece 56 may be formed on magnet 54 without an adhesive layer. In some example, a thin adhesive layer may be used to bond magnet 54 and pole piece 56 to platform layer 66.

Various examples have been described. These and other examples are within the scope of the following claims.

What is claimed is:
1. A magnetic circuit assembly comprising:
 a magnet assembly defining a central axis, wherein the magnet assembly comprises:
  a pole piece; and
  a magnet underlying the pole piece, wherein the magnet comprises a relatively high coefficient of thermal expansion (CTE) material; and
 an excitation ring, comprising:
  a base, comprising:
   a platform layer underlying the magnet, wherein the platform layer comprises a relatively high CTE material;
   an upper base layer underlying the platform layer, wherein the upper base layer comprises a relatively low CTE material; and
   a lower base layer underlying the upper base layer, wherein the lower base layer comprises a relatively high CTE material; and
  an outer ring overlying the upper base layer and positioned around the magnet assembly, wherein the outer ring comprises a relatively low CTE material, wherein the outer ring is configured to couple to an outer radial portion of a proof mass assembly, and wherein each relatively high CTE material has a higher CTE than each relatively low CTE material.

2. The magnetic circuit assembly of claim 1, wherein each relatively high CTE material has a CTE greater than or equal to 8 ppm/° C. at room temperature, and wherein each relatively low CTE material has a CTE less than or equal to about 3 ppm/° C. at room temperature.

3. The magnetic circuit assembly of claim 1, wherein a difference between a CTE of the relatively high CTE material of the magnet and a CTE of the relatively high CTE material of the platform layer is less than about 4 ppm/° C. at room temperature.

4. The magnetic circuit assembly of claim 1, wherein a difference between a CTE of the proof mass assembly and at least one of a CTE of the relatively low CTE material of the outer ring or a CTE of the relatively low CTE material of the upper base layer is less than about 2 ppm/° C. at room temperature.

5. The magnetic circuit assembly of claim 1, wherein the pole piece comprises a relatively high CTE material.

6. The magnetic circuit assembly of claim 5, wherein a difference between a CTE of the relatively high CTE material of the magnet and a CTE of the relatively high CTE material of the pole piece is less than about 4 ppm/° C. at room temperature.

7. The magnetic circuit assembly of claim 1, wherein the platform layer and the lower base layer comprise a same material.

8. The magnetic circuit assembly of claim 1, wherein the upper base layer and the outer ring are monolithic.

9. The magnetic circuit assembly of claim 1,
wherein a ratio of a diameter of the platform layer to a diameter of the lower base layer is between about 0.5 and about 2, and
wherein a ratio of a thickness of the platform layer to a thickness of the lower base layer at the central axis is between about 0.5 and about 2.

10. The magnetic circuit assembly of claim 1, wherein the magnet comprises at least one of alnico, samarium-cobalt, or neodymium-iron-boron.

11. The magnetic circuit assembly of claim 1, wherein each of the platform layer and the lower base layer comprises a nickel-iron alloy material having a nickel concentration greater than about 40 percent.

12. The magnetic circuit assembly of claim 1, wherein each of the outer ring and the upper base layer comprises a material having a maximum relative magnetic permeability greater than about 1500.

13. The magnetic circuit assembly of claim 1, wherein at least one of the platform layer or the lower base layer is inset into the upper base layer.

14. A transducer, comprising:
an upper magnetic circuit assembly;
a lower magnetic circuit assembly; and
a proof mass assembly positioned between the upper and lower magnetic circuit assemblies, wherein the proof mass assembly comprises a relatively low CTE material,
wherein each of the upper and lower magnetic circuit assemblies comprises:
a magnet assembly defining a central axis, wherein the magnet assembly comprises:
a pole piece; and
a magnet underlying the pole piece, wherein the magnet comprises a relatively high coefficient of thermal expansion (CTE) material; and
an excitation ring, comprising:
a base, comprising:
a platform layer underlying the magnet, wherein the platform layer comprises a relatively high CTE material;
an upper base layer underlying the platform layer, wherein the upper base layer comprises a relatively low CTE material; and
a lower base layer underlying the upper base layer, wherein the lower base layer comprises a relatively high CTE material; and
an outer ring overlying the upper base layer and positioned around the magnet assembly, wherein the outer ring comprises a relatively low CTE material, wherein the outer ring is configured to couple to an outer radial portion of a proof mass assembly, and wherein each relatively high CTE material has a higher CTE than each relatively low CTE material.

15. The transducer of claim 14, wherein each relatively high CTE material has a CTE greater than or equal to 8 ppm/° C. at room temperature, and wherein each relatively low CTE material has a CTE less than or equal to about 3 ppm/° C. at room temperature.

16. A method of forming a magnetic circuit assembly, comprising:
forming an upper base layer and an outer ring overlying the upper base layer, wherein each of the upper base layer and the outer ring comprises a relatively low CTE material;
forming a platform layer on an upper surface of the upper base layer and a lower base layer on a lower surface of the upper base layer to form an excitation ring, wherein each of the platform layer and the lower base layer comprises a relatively high CTE material, and wherein each relatively high CTE material has a higher CTE than each relatively low CTE material; and
forming a magnet and a pole piece on an upper surface of the platform layer.

17. The method of claim 16,
wherein the upper base layer comprises a top cavity and a bottom cavity,
wherein the platform layer is formed in the top cavity, and
wherein the lower base layer is formed in the bottom cavity.

18. The method of claim 17, wherein forming the platform layer and the lower base layer further comprises:
additively depositing the relatively high CTE material in the top cavity to form the platform layer; and
additively depositing the relatively high CTE material in the bottom cavity to form the lower base layer.

19. The method of claim 18, wherein forming the magnet further comprises additively depositing the magnet on the upper surface of the platform layer.

20. The method of claim 16, wherein each relatively high CTE material has a CTE greater than or equal to 8 ppm/° C. at room temperature, and wherein each relatively low CTE material has a CTE less than or equal to about 3 ppm/° C. at room temperature.

* * * * *